(12) United States Patent
Frisch

(10) Patent No.: US 9,274,240 B2
(45) Date of Patent: Mar. 1, 2016

(54) SYSTEMS AND METHODS TO DISCRIMINATE ANNULAR HEAVY FLUIDS FROM CEMENT

(75) Inventor: Gary J. Frisch, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 424 days.

(21) Appl. No.: 13/809,766

(22) PCT Filed: Aug. 23, 2011

(86) PCT No.: PCT/US2011/048759
§ 371 (c)(1),
(2), (4) Date: Jan. 11, 2013

(87) PCT Pub. No.: WO2012/027334
PCT Pub. Date: Mar. 1, 2012

(65) Prior Publication Data
US 2013/0114377 A1    May 9, 2013

Related U.S. Application Data

(60) Provisional application No. 61/375,928, filed on Aug. 23, 2010.

(51) Int. Cl.
*G01V 1/50* (2006.01)
*E21B 47/00* (2012.01)
*G01V 1/44* (2006.01)

(52) U.S. Cl.
CPC .............. *G01V 1/50* (2013.01); *E21B 47/0005* (2013.01); *G01V 1/44* (2013.01)

(58) Field of Classification Search
CPC ......... G01V 1/50; G01V 1/44; E21B 47/0005
USPC ...................................... 367/35, 69; 181/105
See application file for complete search history.

(56) References Cited

U.S. PATENT DOCUMENTS

| 5,036,496 A | 7/1991 | Rutledge |
| 5,763,773 A | 6/1998 | Birchak et al. |

(Continued)

FOREIGN PATENT DOCUMENTS

WO     WO-2012/027334     3/2012

OTHER PUBLICATIONS

PCT International Search Report and Written Opinion, dated Dec. 22, 2011, Appl No. PCT/US2011/048759, "Systems and Methods to Discriminate Annular Heavy Fluids From Cement", filed Aug. 23, 2011, 10 pgs.
U.S. Appl. No. 61/375,928, "Systems and Methods to Discriminate Annular Heavy Fluids From Cement", filed Aug. 23, 2010, 6 pgs.
CA Examiner'S Letter, dated Apr. 10, 2014, U.S. Pat. No. 2,805,004, "Systems and Methods to Discriminate Annular Heavy Fluids From Cement," Filed Aug. 23, 2011, 4 pgs.

(Continued)

*Primary Examiner* — Daniel L Murphy
(74) *Attorney, Agent, or Firm* — Krueger Iselin LLP; Benjamin Fite

(57) ABSTRACT

A cement bond logging method for wells containing heavy mud and cement is provided. Acoustic logging tool data from a well having material in the annular space between the casing and the formation is analyzed to map relationships between waveform amplitude, acoustic impedance, and impedance derivative of the material. Map zones representing fully bonded well regions and partially bonded well regions are identified. An image is generated from the log data corresponding to the identified map zones. A cement bond logging system including a memory having cement bond logging software and a processor coupled to the memory to execute the software is also provided.

24 Claims, 12 Drawing Sheets

(56) References Cited

U.S. PATENT DOCUMENTS

| | | |
|---|---|---|
| 6,041,861 A | 3/2000 | Mandal |
| 8,162,050 B2 | 4/2012 | Roddy et al. |
| 8,291,975 B2 | 10/2012 | Roddy et al. |
| 8,297,352 B2 | 10/2012 | Roddy et al. |
| 8,297,353 B2 | 10/2012 | Roddy et al. |
| 8,302,686 B2 | 11/2012 | Roddy et al. |
| 2006/0067162 A1 | 3/2006 | Blankinship et al. |
| 2009/0086575 A1 | 4/2009 | Tello et al. |
| 2012/0158307 A1 | 6/2012 | Jay et al. |

OTHER PUBLICATIONS

CA Second Examiner's Letter, dated Dec. 15, 2014, U.S. Pat. No. 2,805,004, "Systems and Methods to Discriminate Annular Heavy Fluids From Cement," Filed Aug. 23, 2011, 5 pgs.

AU Examination Report, dated Apr. 11, 2013, Appl No. 2011293564, "Systems and Methods to Discriminate Annular Heavy Fluids From Cement", filed Aug. 23, 2011, 3 pgs.

PCT International Preliminary Report on Patentability, dated Mar. 7, 2013, Appl No. PCT/US2011/048759, "Systems and Methods to Discriminate Annular Heavy Fluids From Cement", filed Aug. 23, 2011, 9 pgs.

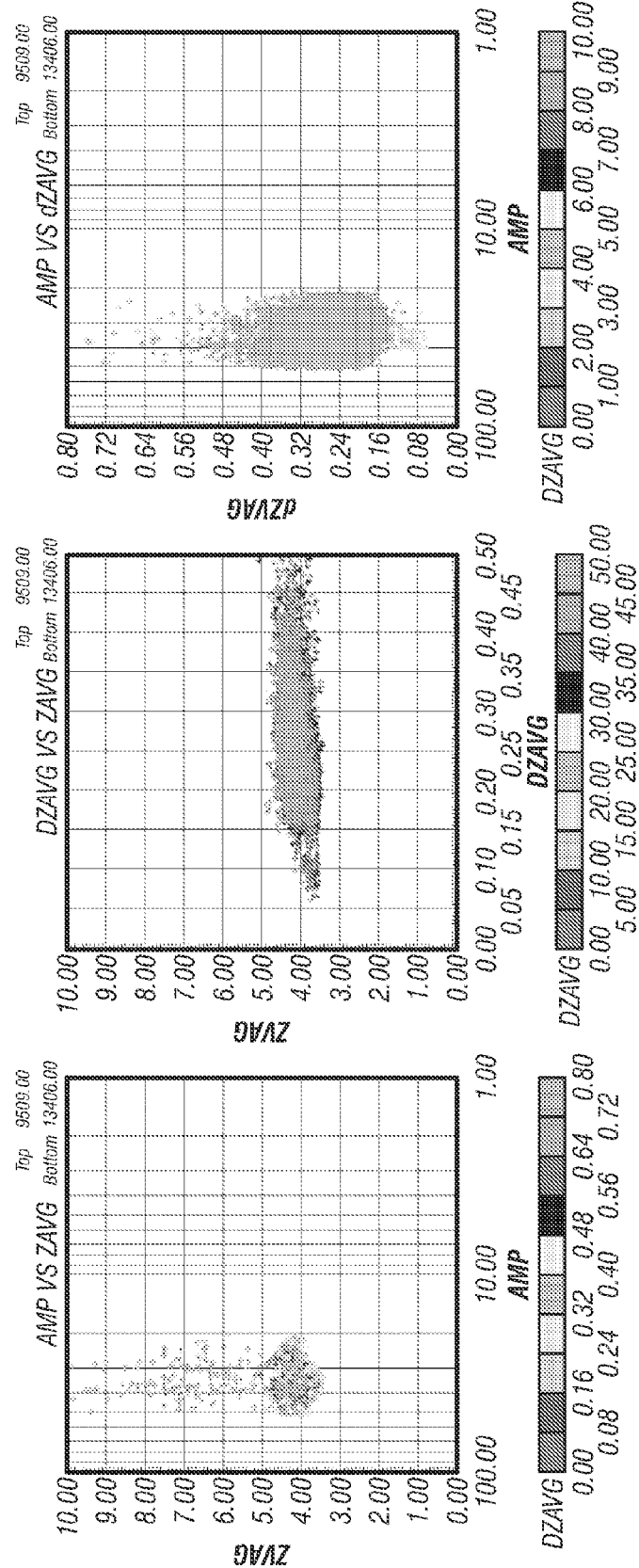

SYSTEMS AND METHODS TO DISCRIMINATE ANNULAR HEAVY FLUIDS FROM CEMENT

CROSS-REFERENCE TO RELATED APPLICATIONS

This application claims the benefit of and incorporates by reference U.S. Patent Application Ser. No. 61/375,928, which was filed on Aug. 23, 2010.

BACKGROUND

When drilling, completing, or otherwise operating on a well, it is often necessary to determine if the material in the annular space between the formation and casing, and/or the annular space between multiple casing strings is filled with cement, fluids, mud and/or solid materials. For example, when cementing to provide zonal isolation, cement is usually placed in the annular space (by any one of various methods), displacing the material in the annular space with cement that will solidify with time. The original fluids in the annular space can include water, drilling mud, hydrocarbons, formation fluids, formation solids, and any type of combination of above. It is standard practice to log the well before completion to determine the efficiency with which these fluids are displaced and the consequent effectiveness of the zonal isolation. Several logging tools have been developed in the past to help determine the material behind pipe including sonic, ultrasonic and temperature tools, and they are often run together to evaluate the cementing job.

As another example, operators often wish to determine if the pipe or casing is attached to formation after the economic life of the well is finished. It may be possible to cut the casing above the attached point or points and remove the casing from the well. The same logging tools are run to determine the portions of casing that are free. From the data recorded from these cement evaluation tools both the original cement sheath, and the remaining cement sheath can be determined by scientific principles that are well known and available.

One of the common methods to determine the presence of cement sheath is the use of ultrasonic tools that provide a measurement of the acoustic impedance of the material, which is defined as $Z=\rho V$, where $V$ is the speed of sound in the material and $\rho$ is the density of the material. However, there are regions where the acoustic impedances of light (foam) cement overlap with the acoustic impedance values of water and light drilling mud (see FIG. 1). Additional analysis (based on the measurement variance) has been used in past to separate out foamed cement from liquids when the impedance values are the same.

Technology has evolved, and there now exist heavy drilling muds having acoustic impedance values that overlap with solid (non-foamed) cement (see FIG. 1). Techniques currently available cannot reliably distinguish between overlapping impedance values to determine cement bonding efficiency. Thus, there exists a need for a method and system to determine the quality of the bond between the casing and the surrounding formation.

BRIEF DESCRIPTION OF THE DRAWINGS

For a more detailed description of preferred embodiments of the present invention, reference will now be made to the accompanying drawings, wherein:

FIGS. 5A'-5C' show crossplots of logging data for a partially bonded zone.

FIGS. 5A"-5C" show crossplots of logging data for a bonded and transitional zone.

DETAILED DESCRIPTION

Various embodiments of the present invention include extending the measurement-variance analysis technique to distinguish between heavy drilling muds and cement. Some embodiments are directed to methods including analyzing acoustic logging tool data from a well having material in an annular space between a formation and a casing to map relationships between waveform amplitude, acoustic impedance, and impedance derivative of the material where the material includes heavy mud and cement. The results are used to identify map zones representing at least fully bonded well regions and partially bonded well regions. The identified map zones are used to generate an image from the log data corresponding to the identified map zones, where the image identifies which of the map zones corresponds to various positions along the well.

Further embodiments of the present invention are directed to a cement bond logging system including a memory having cement bond logging software and a processor coupled to the memory to execute the software. In certain embodiments, the software configures the processor to obtain acoustic logging tool measurements, analyze the measurements to map relationships between waveform amplitude, acoustic impedance, and impedance derivative of the material between the casing and the formation, identify the zones representing the fully bonded well regions and partially bonded well regions, and display an image identifying which of the zones corresponds to various positions along the well.

Thus, the present invention uses novel methods and systems to overcome the various problems of the prior art, thereby enabling an improved understanding of the material in the annular space before the well is completed, and again after the well has been produced immediately before abandonment.

Figure 1:
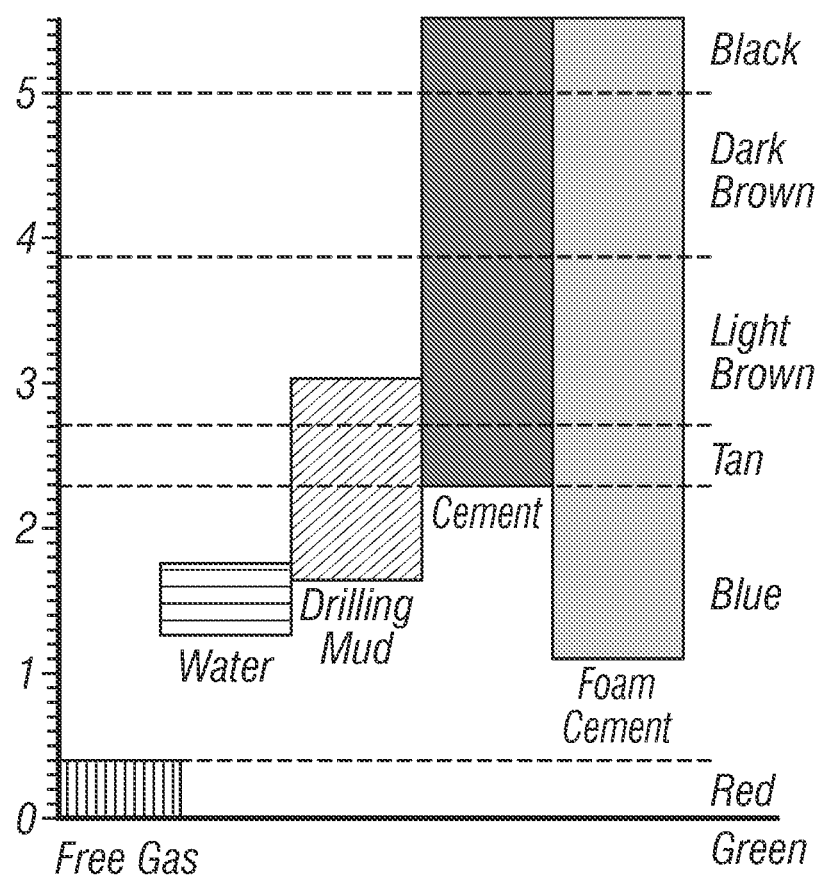
FIG. 1 depicts typical acoustic impedance values for annular fluids.

FIG. 1 shows typical, although not comprehensive, ranges of acoustic impedance values for gas, water, drilling mud, cement, and foamed cement. Depending upon the material and composition used, the impedance values of the drilling mud, cement, and foam cement may fall in the chart ranges or out of the range. For example, when a light cement is mixed with free gas (usually nitrogen) the resultant cement impedance can be less than that of water. To solve this problem, a computer program was developed that uses both the raw impedance data, along with the variation of the data, to determine if the material is a liquid or solid.

Figures 2A, 2B:
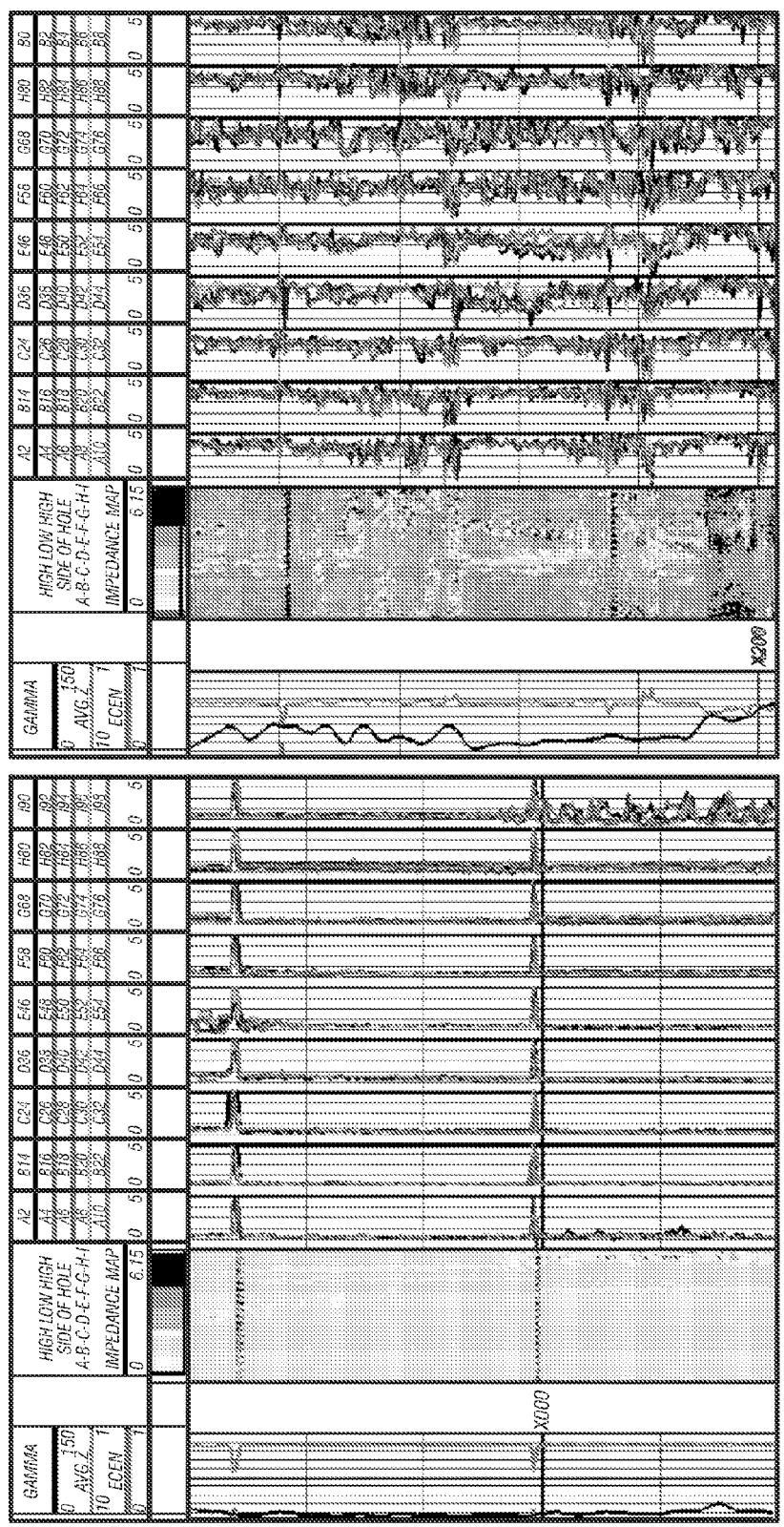
FIGS. 2A-2B show illustrative acoustic impedance logs comparing a cemented region to an uncemented region.

In the prior art, the first step is to analyze the impedance values from the raw data as shown in FIGS. 2A-2B. FIGS. 2A-2B show acoustic impedance logs. The left most column provides curves for gamma intensity, eccentricity of the tool in the borehole, and average acoustic impedance. The second column is not used here, but it would normally provide labels indicating the depth of various features. The third column provides an impedance map of the borehole wall, with typical colors ranging from red to blue to brown to indicate impedance values similar to stated colors on the right side of FIG. 1. About 100 or more measurements can be made around the circumference of the borehole to build up this map. The top of column three indicates how the circumference can be divided into sectors ranging from A through I. The remaining columns provide curves corresponding to five points within each sector.

A comparison of FIGS. 2A and 2B illustrates the difference between a region having mostly water in the annulus and a region having cement in the annulus. One of skill in the art would observe that the cemented region generally exhibits a great deal more variance than the fluid region. Note that the horizontal lines in the impedance image represent couplings between the tubular segments rather than cement, but this feature is readily understood and discounted by one of skill in the art.

According to the prior art, the next step is to quantify the activity level. That is accomplished by taking the derivative of the impedance data, or in other words, measuring the variance of the data. This will create a mathematical value of the rate of data change, with fluids showing a low rate of change and solids showing a high rate of change. The process results in a derivative map, or dzmap. The derivative map can be combined with the raw impedance data to create a cement map that may be used to indicate what type of material is in the annular space. If both the raw impedance and derivative of that raw impedance indicate fluids, the cement map shows a certain color, for instance blue. If either the raw data or the derivative indicate solid materials, the map shows a different color, for example brown, indicating solid materials.

Figures 3A, 3B:
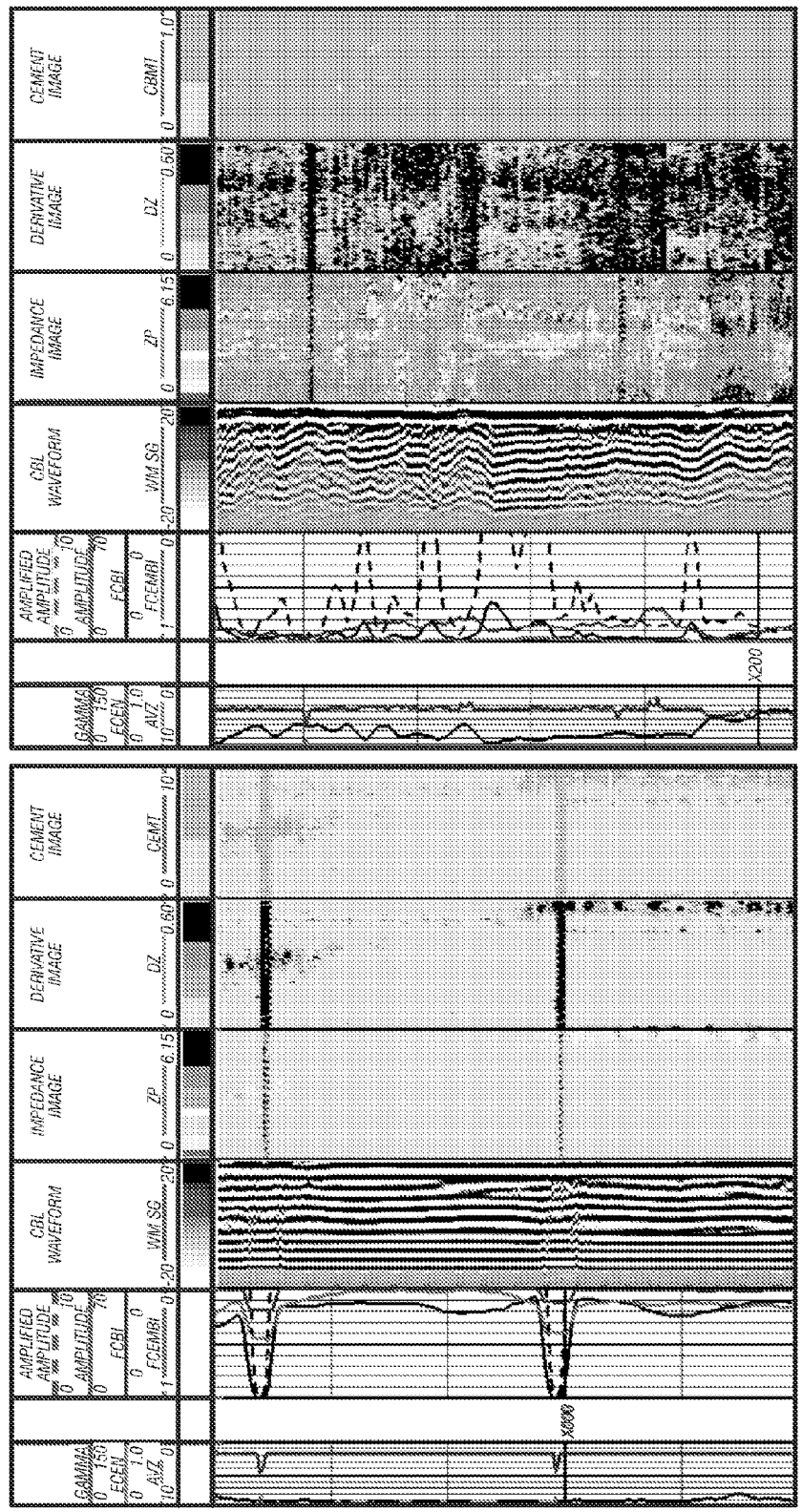
FIGS. 3A-3B show processed acoustic impedance logs for free pipe and bonded pipe.

FIG. 3 shows the results of this process using the same data shown in FIG. 2 for both the free pipe and the bonded pipe. The first two columns are the same as mentioned in the discussion of FIG. 2 above. The third column shows four curves—one for the amplitude of the reflected acoustic pulse, one for an amplified version of the amplitude curve, one for a cement bond index derived from the raw impedance data (FCBI), and one for a cement bond index derived from the combined impedance and derivative data (FCEMBI). The fourth column (CBL waveform) shows the reflected acoustic waveform as a function of time, which aids in identifying and tracking reflective interfaces. The fifth column shows the impedance image. The sixth column shows an image of the spatial derivative of the impedance with respect to depth, though other derivatives or variance measurements may be used. The seventh column shows the image derived from combining the impedance data with the derivative data. One of skill in the art would realize that a much more readable image is obtained using this process.

Figure 4A:
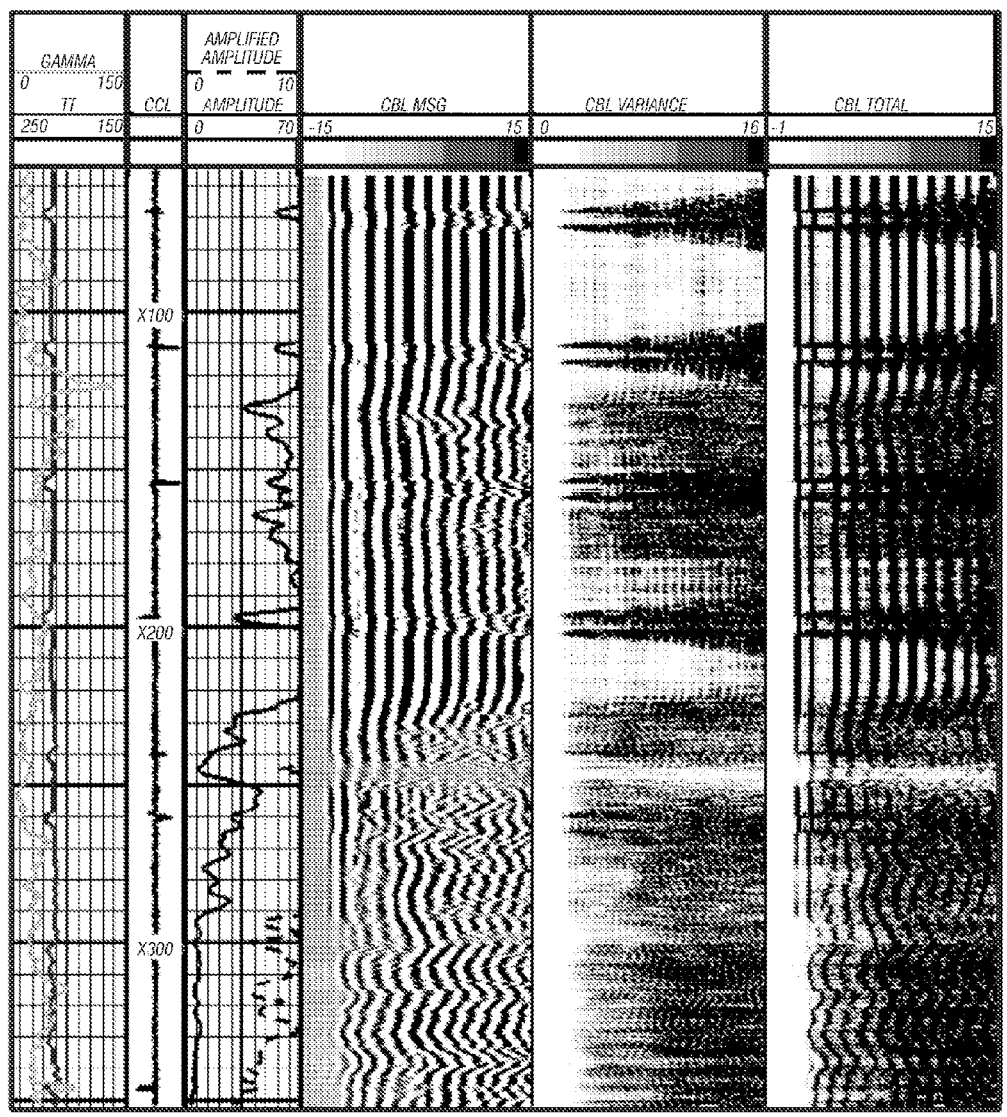
FIGS. 4A-4D depict a logs of an acoustic waveform and its derivatives.
Figure 4B:
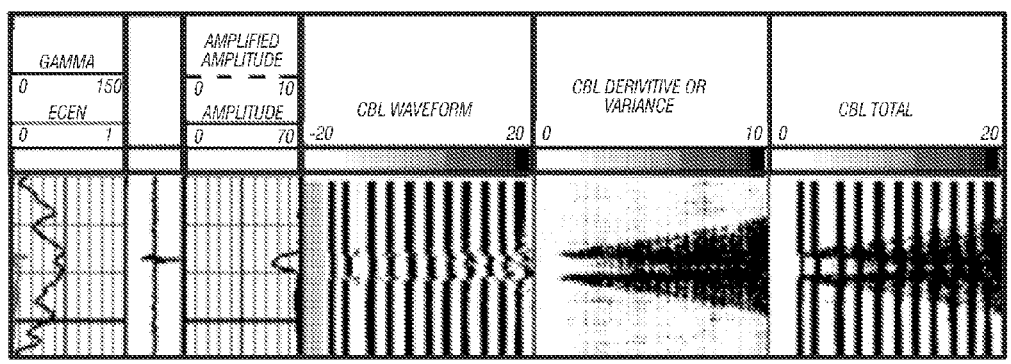
Figure 4C:
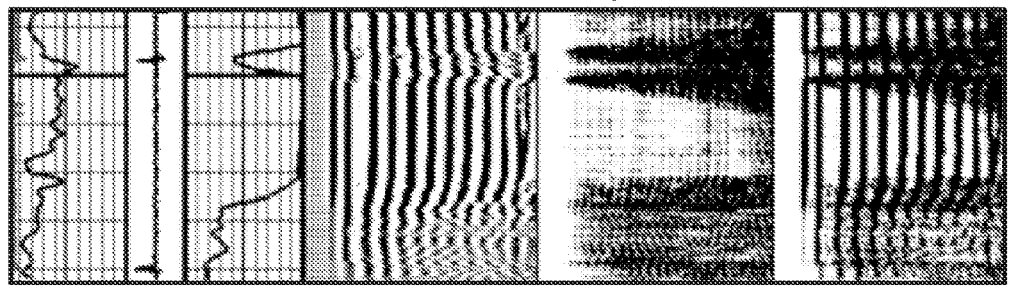
Figure 4D:

It is known in the prior art that a similar process can be applied to other tools for cement evaluation. For example, the derivative process can be applied to the Cement Bond Log (CBL) waveform as shown in FIGS. 4A-4D. In FIG. 4A, the first column shows a gamma ray curve and travel time curve. The second column shows a depth label. The third column shows curves for amplitude and amplified amplitude. The fourth column shows the CBL waveform. The fifth column shows the spatial derivative (with respect to depth) of the CBL waveform, and the sixth column shows the spatial derivative overlaid on the CBL waveform. FIGS. 4B-4D show selected portions of this log, with the difference that the first column shows curves for gamma and eccentricity. As illustrated in FIGS. 4B-4D, one of skill in the art would realize that there are several distinct results from this process that help to determine if the casing is bonded to the formation.

The prior art also teaches that sudden impedance changes, e.g., changes caused by a coupler between tubular, may appear as chevron patterns in the CBL waveform derivative. Characteristics of these chevron patterns may help determine if the casing is bonded to both the cement and/or the formation. There may be definite pattern changes from the chevrons that determine if the casing is free pipe (FIG. 4B), bonded (FIG. 4C), partially bonded, or micro-annulus (FIG. 4D). A micro-annulus is a small gap or separation between the pipe and the cement.

This variance-based processing technique, often termed ACE for "Advanced Cement Evaluation," has been applied to various cement logs in the past to distinguish foamed cement from fluids based on the understanding that such cements exhibit a high amount of impedance variation. Although a straightforward application of the conventional ACE processing technique fails when used in environments having heavy drilling muds, with suitable modifications, ACE processing may be used to distinguish such fluids from even non-foamed cements.

Figures 5A, 5B, 5C:
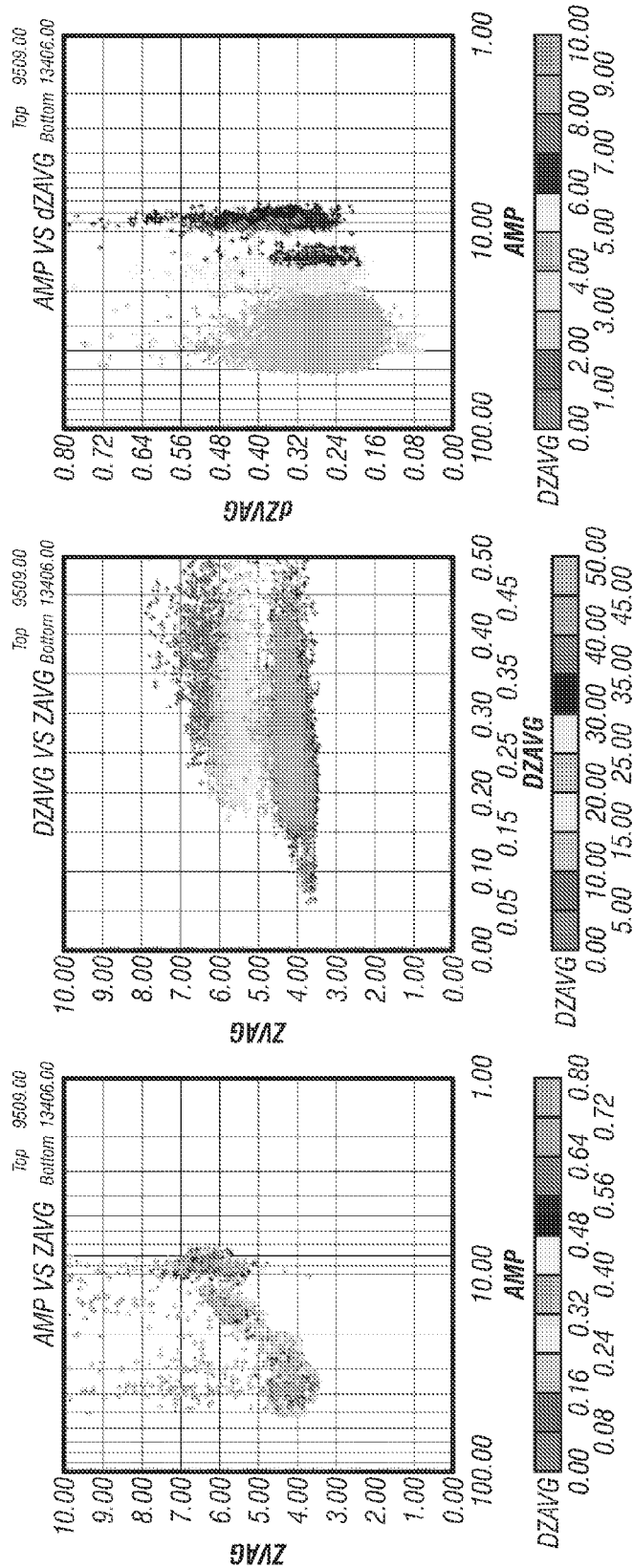
FIGS. 5A-5C show crossplots of amplitude, acoustic impedance, and impedance derivative data.
Figures 5A, 5B, 5C:
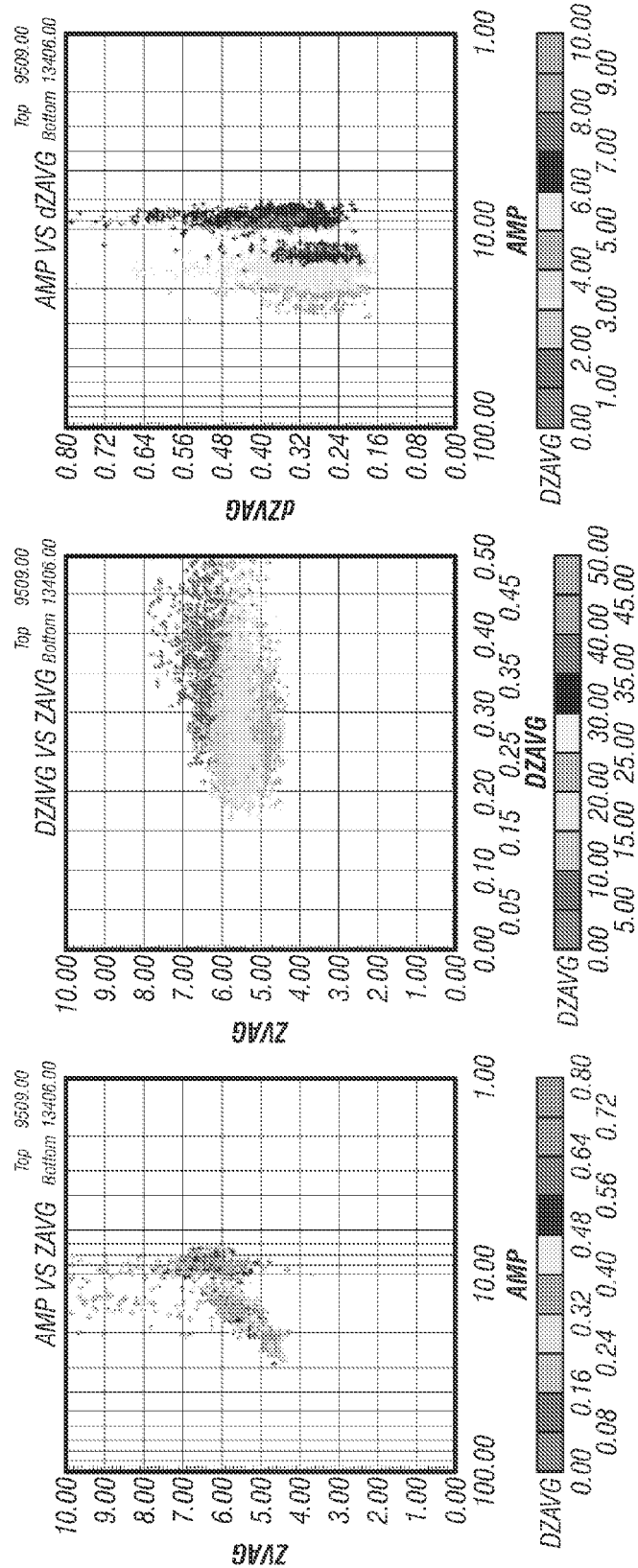
Figure 6A:
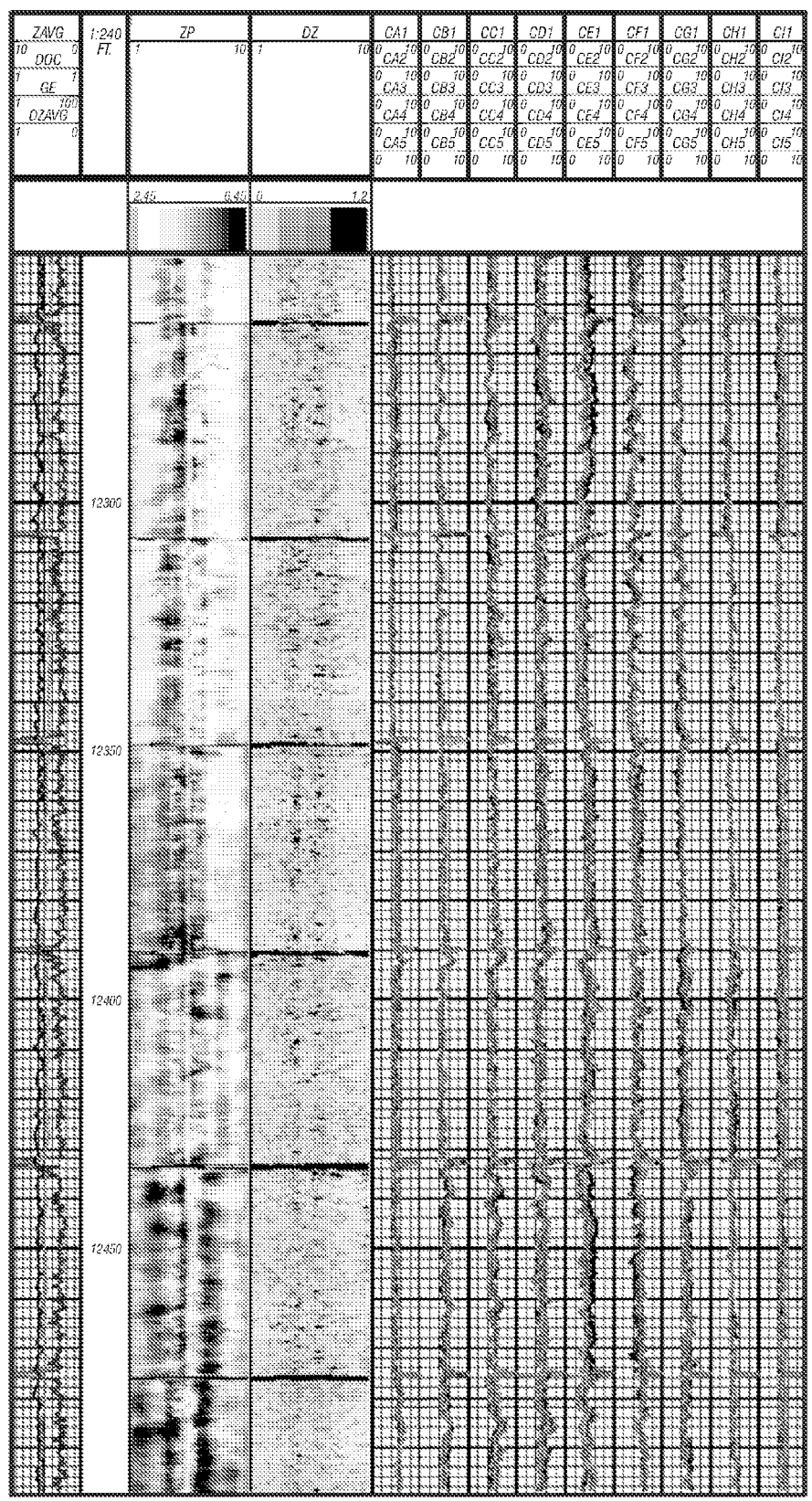
FIG. 6A shows illustrative log data from a test well.

In accordance with several embodiments of the present invention, FIG. 6A shows the log data from a well having heavy drilling mud and cement in the annular space. In an embodiment, the first step is to use data from both raw and computer processed logs to determine the impedance values of the mud and cements. FIGS. 5A-5C show crossplots illustrating the relationships between the CBL waveform amplitude (AMP), average impedance (ZAVG), and the average of the impedance derivative (DZAVG). These relationships will be utilized when determining the various components of the annular space.

In the present embodiment, the above crossplots over the entire wellbore show several distinct features. With these crossplots, the lower right hand corners will be considered free pipe, while the upper right hand corners will be considered cement. In the present embodiment, it appears that there are three map zones consisting of bonded pipe, partially bonded pipe (between 10% and 90% bonded), and a transition zone.

In another embodiment, the crossplotted data may be separated to more clearly illustrate the three map zones. FIGS. 5A'-5C' show the data points for the partially bonded map zone, while FIGS. 5A"-5C" show the data points for the bonded and transitional map zones. One of skill in the art will realize that this separation of the crossplots makes it easier to see the three map zones, especially the partially bonded map zone. This map zone will be identified if the data demonstrates a high amplitude, for example, in one embodiment around 45, and impedance values, for example, around 4.5.

In some embodiments, the impedance of the transition and bonded map zones is usually above 5, which corresponds to an amplitude reading around 9, both indicating cement. The activity level of the transition and bonded map zone is higher than the partially bonded map zone, with a value, for example, around 0.35 indicating cement. The preceding values of amplitude, activity, and impedance are exemplary data from a specific well, and may not be the same for other wells with different compositions of cement and mud.

In further embodiments of the present invention, the map zones are identified by determining the approximate center point of at least one cluster in the acoustic logging tool data. The center point may be identified using an image of the clusters. In another embodiment, software may be utilized to determine the approximate center points of the clusters. One of skill in the art will realize that various statistical analysis techniques, such as cluster analysis, may be used to determine the clusters and the center points of the clusters.

Figure 6B:
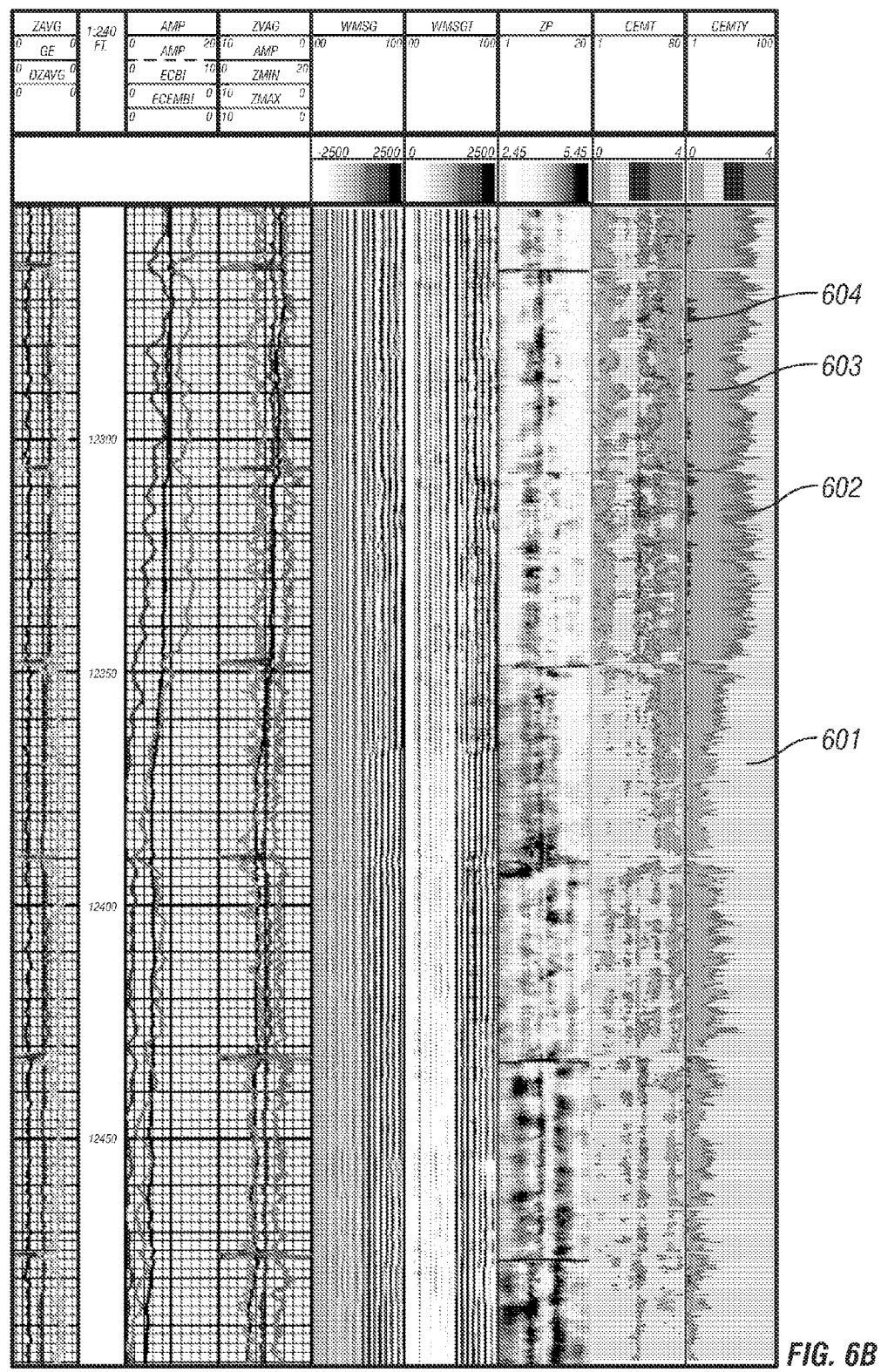
FIG. 6B shows processed log data identifying bonding zones at various depths.

Using these crossplot center point values in the ACE program, one may differentiate between the heavy mud with high impedance and cement. In an exemplary embodiment, as illustrated in FIG. 6B, the first column shows curves for average acoustic impedance, gamma, and average of the impedance derivative. The second column provides labels for depth. The third column provides curves for waveform amplitude, amplified amplitude, FCBI and FCEMBI. The fourth column provides curves for average impedance, waveform amplitude, minimum impedance, and maximum impedance. The fifth column shows the waveform, while the sixth column shows a thresholded or "truncated" waveform. The seventh column shows an acoustic impedance map. The eighth column is a map of cement with shaded area 601 indicating cement, area 602 indicating "contaminated" cement, area 603 indicating probable mud, and area 604 indicating water. In one embodiment, cement is identified for impedances above about 4.5, amplitudes below about 9, or impedance derivatives above about 0.35. High impedance derivatives with low impedances are identified as "contaminated" cement. Low impedances with low derivatives are fluid, while very low impedances with low derivatives are "water." The ninth column is a "sorted" version of the eighth column to show the relative proportions of cement, contaminated cement, mud, and water.

With the improved processing, column eight of the log shows cement at the bottom of the logged region going to through a transition zone to a partially bonded section. The casing is lying on the low side of wellbore as indicated by both the cement and higher activity level. The ability to use both the impedance values and the activity values provides a more accurate determination of the cement sheath around the casing.

This solution extends a proven method that originally was developed to separate low impedance cement from low impedance fluids. This solution is an original method to solve the problem with high impedance mud along with high impedance cement. The use of the crossplots provide a more accurate determination of mud impedances at downhole conditions with pressure and temperature of the well. This method may also allow separation in older wells of mud fill from the cement allowing easier determination of pipe recovery.

Figure 7:
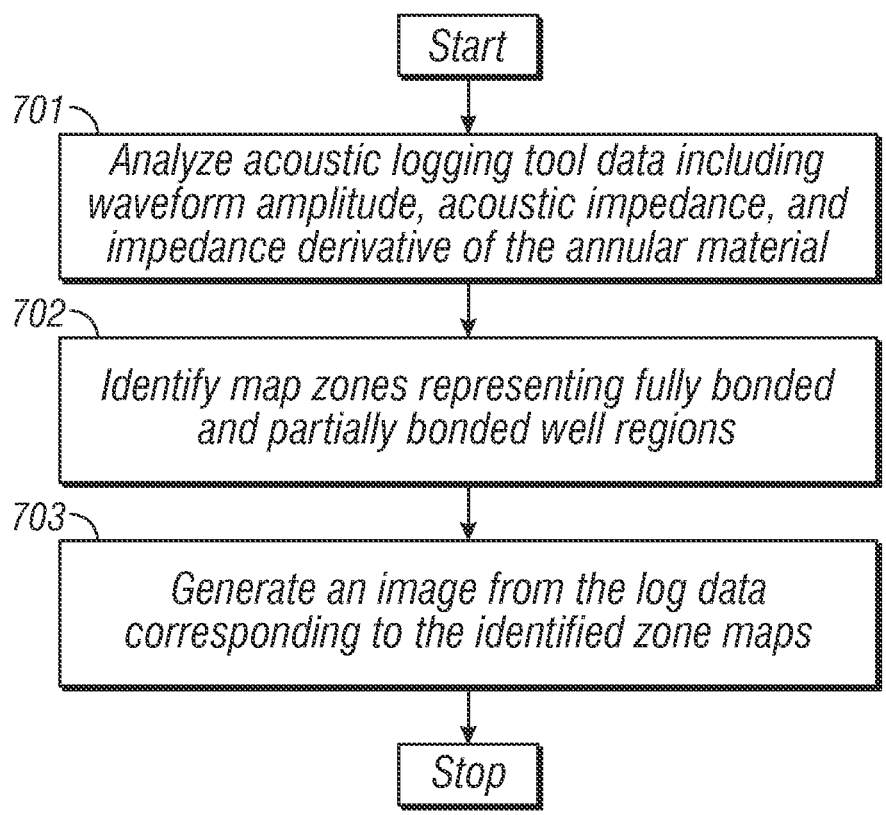
FIG. 7 illustrates a cement bond logging method.

One embodiment of a cement bond logging method according to the present invention is illustrated by FIG. 7. As shown in step 701, an analysis is performed of the acoustic logging tool data from a well having material in an annular space between the formation and the casing. This analysis maps relationships between waveform amplitude, acoustic impedance of the material, and impedance derivative of the material where the material includes heavy mud and cement. In an embodiment, the analysis of step 701 is performed by generating crossplots of waveform amplitude, acoustic impedance of the material, and impedance derivative of the material.

Step 702 includes identifying map zones representing fully bonded well regions and partially bonded well regions. In one embodiment, an additional transition region may also be included, but its inclusion is purely optional. In a further embodiment, identifying map zones in step 702 includes determining the approximate center point of at least one cluster in the acoustic logging tool data.

In step 702, a partially bonded map zone may be identified by a high waveform amplitude relative to a fully bonded map zone amplitude. In one embodiment, the center point for the amplitude for the partially bonded data cluster has a value greater than about 35. In another embodiment, the amplitude for the partially bonded data cluster has a value of about 45. In an additional embodiment, the partially bonded map zone is further identified by a low impedance relative to the fully bonded map zone impedance. In one embodiment, the center point of the impedance for the partially bonded data cluster is less than about 5. In another embodiment, the center point of the impedance for the partially bonded data cluster is about 4.5.

In a further embodiment of step 702, the fully bonded map zone is identified by a high impedance relative to the partially bonded map zone. In an embodiment, the center point of the impedance for the fully bonded data cluster has a value greater than about 5. In another embodiment, the center point of the impedance for the fully bonded data cluster has a value in the range between about 5.1 to about 7.

In an embodiment of step 702, the partially bonded map zone has a low impedance relative to the fully bonded map zone, and a low amplitude relative to a fully bonded map zone amplitude. In one embodiment, the center point of the amplitude for the fully bonded data cluster has a value in the range between about 8 and about 10. In a further embodiment, the center point of the amplitude for the fully bonded data cluster is about 9.

In another embodiment of step 702, the fully bonded map zone is identified by a high impedance relative to the partially bonded map zone, and the impedance derivative for the fully bonded map zone is higher than the impedance derivative in a partially bonded map zone. In one embodiment, the center point of the impedance derivative for the fully bonded map zone is greater than about 0.35.

Step 703 includes generating an image from the log data corresponding to the identified map zones where the image identifies which map zones correspond to various positions along the well.

Figure 8:
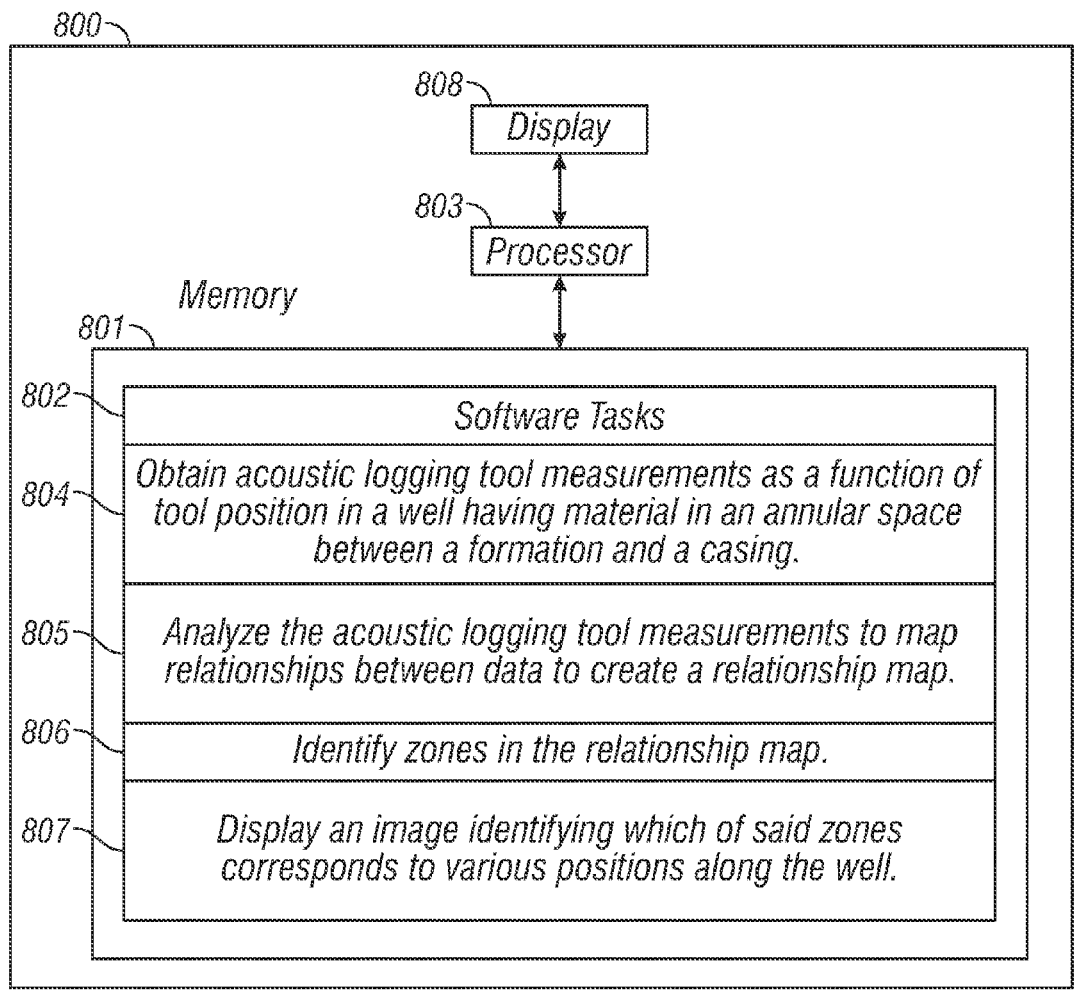
FIG. 8 illustrates a cement bond logging system.

An embodiment of a cement bond logging system according the present invention is illustrated by FIG. 8. The system 800 includes a memory 801 containing cement bond logging software 802, and a processor 803 coupled to the memory 801 to execute the software. The software 802 configures the processor 803 to perform a series of tasks. In an additional embodiment, the system 800 further includes a display 808 coupled to the processor 803.

In one embodiment, task 804 involves obtaining acoustic logging tool measurements as a function of tool position in a well having material in an annular space between a formation and the casing. The material includes cement and heavy mud.

In another embodiment, task 805 involves analyzing the acoustic logging tool measurements to map relationships between waveform amplitude, acoustic impedance of the material, and impedance derivative of the material. This analysis results in the creation of a relationship map. In an embodiment, the analysis of task 805 is performed by generating crossplots of waveform amplitude, acoustic impedance of the material, and impedance derivative of the material.

In a further embodiment, task 806 includes identifying zones in the relationship map where the zones may represent a fully bonded well region and a partially bonded well region. In one embodiment, an additional transition region may also be included, but its inclusion is purely optional. In an additional embodiment, identifying map zones in task 806 includes determining the approximate center point of at least one cluster in the acoustic logging tool data. In a further embodiment, the software 802 configures the processor 803 to determine approximate center points for clusters in the acoustic logging tool measurements.

In task 806, a partially bonded map zone may be identified by a high waveform amplitude relative to a fully bonded map zone amplitude. In one embodiment, the center point for the amplitude for the partially bonded data cluster has a value greater than about 35. In another embodiment, the amplitude for the partially bonded data cluster has a value of about 45. In an additional embodiment, the partially bonded map zone is further identified by a low impedance relative to the fully bonded map zone impedance. In one embodiment, the center point of the impedance for the partially bonded data cluster is less than about 5. In another embodiment, the center point of the impedance for the partially bonded data cluster is about 4.5.

In a further embodiment of task 806, the fully bonded map zone is identified by a high impedance relative to the partially bonded map zone. In an embodiment, the center point of the impedance for the fully bonded data cluster has a value greater than about 5. In another embodiment, the center point of the impedance for the fully bonded data cluster has a value in the range between about 5.1 to about 7.

In an embodiment of task 806, the partially bonded map zone has a low impedance relative to the fully bonded map zone, and a low amplitude relative to a fully bonded map zone amplitude. In one embodiment, the center point of the amplitude for the fully bonded data cluster has a value in the range between about 8 and about 10. In a further embodiment, the center point of the amplitude for the fully bonded data cluster is about 9.

In another embodiment of task 806, the fully bonded map zone is identified by a high impedance relative to the partially bonded map zone, and the impedance derivative for the fully bonded map zone is higher than the impedance derivative in a partially bonded map zone. In one embodiment, the center point of the impedance derivative for the fully bonded map zone is greater than about 0.35.

In an embodiment, task 807 displays an image identifying which of the zones corresponds to various positions along the well.

With new restrictions and regulations governing cement sheath evaluation and placement expected in the future, this method and system provide a solution to a problem where there was not an efficient method available previously. The disclosed method and system provide a detailed solution when heavier muds approach the impedance of the cement in place.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

What is claimed is:

1. A cement bond logging method comprising:
analyzing acoustic logging tool data from a well having material in an annular space between a formation and a casing to map relationships between waveform amplitude, acoustic impedance of the material, and impedance derivative of the material, wherein the material comprises heavy mud and cement;
identifying map zones representing at least: fully bonded well regions and partially bonded well regions;
generating an image from the log data corresponding to the identified map zones, said image identifying which of said map zones corresponds to various positions along the well.

2. The method of claim 1, wherein the map zones further include a representation of a transition zone.

3. The method of claim 1, wherein identifying map zones comprises determining the approximate center point of at least one cluster in the acoustic logging tool data.

4. The method of claim 3, wherein a partially bonded map zone is identified by a high waveform amplitude relative to a fully bonded map zone amplitude.

5. The method of claim 4, wherein the center point of the amplitudes for the partially bonded data cluster has a value greater than about 35.

6. The method of claim 5, wherein the center point of the amplitudes for the partially bonded data cluster has a value of about 45.

7. The method of claim 4, wherein the partially bonded map zone is further identified by a low impedance relative to the fully bonded map zone impedance.

8. The method of claim 7, wherein the center point of the impedance for the partially bonded data cluster is less than about 5.

9. The method of claim 8, wherein the center point of the impedance for the partially bonded data cluster is about 4.5.

10. The method of claim 4, wherein a fully bonded map zone is identified by a high impedance relative to the partially bonded map zone.

11. The method of claim 10, wherein the center point of the impedance for the fully bonded data cluster has a value greater than about 5.

12. The method of claim 11, wherein the center point of the impedance for the fully bonded data cluster has a value in the range between about 5.1 to about 7.

13. The method of claim 10, wherein the partially bonded map zone is further identified by a low amplitude relative to a fully bonded map zone amplitude.

14. The method of claim 13, wherein the center point of the amplitude for the fully bonded data cluster has a value in the range between about 8 and about 10.

15. The method of claim 14, wherein the center point of the amplitude for the fully bonded data cluster is about 9.

16. The method of claim 10, wherein the impedance derivative for the fully bonded map zone is higher than the impedance derivative in the partially bonded map zone.

17. The method of claim 10, wherein the center point of the impedance derivative for the fully bonded map zone is greater than about 0.35.

18. A cement bond logging system comprising:
a memory having cement bond logging software; and
a processor coupled to the memory to execute the software, wherein the software configures the processor to:
obtain acoustic logging tool measurements as a function of tool position in a well having material in an annular space between a formation and a casing, the material comprising cement and heavy mud;
analyze the acoustic logging tool measurements to map relationships between waveform amplitude, acoustic impedance of the material, and impedance derivative of the material, thereby creating a relationship map;
identify zones in the relationship map, the zones representing at least: fully bonded well regions and partially bonded well regions;
display an image identifying which of said zones corresponds to various positions along the well.

19. The system of claim 18, wherein as part of identifying zones, the software configures the processor to determine approximate center points for clusters in the acoustic logging tool measurements.

20. The system of claim 18, wherein the zones further comprise a transition zone.

21. The system of claim 18, wherein a partially bonded zone is identified by a high waveform amplitude relative to a bonded zone amplitude.

22. The system of claim 21, wherein the partially bonded zone is further identified by a low impedance relative to the bonded zone impedance.

23. The system of claim 18, wherein a bonded zone is identified by a higher impedance relative to a partially bonded zone.

24. The system of claim 23, wherein the impedance derivative is higher than the impedance derivative in a partially bonded zone.

\* \* \* \* \*